(12) United States Patent
Ishida

(10) Patent No.: US 10,569,206 B2
(45) Date of Patent: Feb. 25, 2020

(54) OIL SEPARATOR

(71) Applicant: TOKYO ROKI CO., LTD., Yokohama-shi, Kanagawa (JP)

(72) Inventor: Kosaku Ishida, Yokohama (JP)

(73) Assignee: TOKYO ROKI CO., LTD., Yokohama-shi (JP)

(*) Notice: Subject to any disclaimer, the term of this patent is extended or adjusted under 35 U.S.C. 154(b) by 603 days.

(21) Appl. No.: 15/121,674

(22) PCT Filed: Feb. 6, 2014

(86) PCT No.: PCT/JP2014/054630
§ 371 (c)(1),
(2) Date: Sep. 16, 2016

(87) PCT Pub. No.: WO2015/128953
PCT Pub. Date: Sep. 3, 2015

(65) Prior Publication Data
US 2016/0375388 A1    Dec. 29, 2016

(51) Int. Cl.
*B01D 45/00* (2006.01)
*B01D 45/14* (2006.01)
(Continued)

(52) U.S. Cl.
CPC ............ *B01D 45/14* (2013.01); *B01D 45/12* (2013.01); *B04B 5/005* (2013.01); *B04B 5/12* (2013.01);
(Continued)

(58) Field of Classification Search
CPC ........ B01D 45/14; B01D 45/12; B04B 5/005; B04B 5/12; B04B 11/02; B04B 2005/125; F01M 13/04; F01M 2013/0422
See application file for complete search history.

(56) References Cited

U.S. PATENT DOCUMENTS 3,234,716 A * 2/1966 Sevin ................. B01D 45/14
                                                  209/710
6,017,300 A * 1/2000 Herman ................. B04B 1/08
                                                  210/167.02
(Continued)

FOREIGN PATENT DOCUMENTS

DE    102011076465 A1    11/2012
JP        51-76868 A     7/1976
(Continued)

OTHER PUBLICATIONS

International Search Report and Written Opinion for PCT/JP2014/054630, dated Jun. 10, 2014, 7 pgs.
(Continued)

*Primary Examiner* — Dung H Bui
(74) *Attorney, Agent, or Firm* — Harness, Dickey & Pierce, P.L.C.

(57) ABSTRACT

In an oil separator that separates mist oil contained in target gas from the gas, the present disclosure is aimed to easily mount the oil separator to various targets and to increase its versatility. An oil separator according to the present disclosure includes: a nozzle that injects oil from an injection hole to rotate a spindle around an axis; a housing having a gas communicating portion and an oil communicating portion on its bottom; and a joint member that is removably mounted to the housing, and that includes a gas introducing portion and an oil discharge portion, the gas introducing portion introducing blow-by gas and transferring the gas to the gas communicating portion, the oil discharge portion receiving oil from the oil communicating portion and discharging the oil to outside.

7 Claims, 13 Drawing Sheets

(51) Int. Cl.
| | |
|---|---|
| *F01M 13/04* | (2006.01) |
| *B04B 7/02* | (2006.01) |
| *B01D 45/12* | (2006.01) |
| *B04B 5/00* | (2006.01) |
| *B04B 5/12* | (2006.01) |

(52) U.S. Cl.
CPC ............... *B04B 7/02* (2013.01); *F01M 13/04* (2013.01); *B04B 2005/125* (2013.01); *F01M 2013/0422* (2013.01)

(56) References Cited

U.S. PATENT DOCUMENTS

| | | | | |
|---|---|---|---|---|
| 6,110,246 | A * | 8/2000 | Eubank | B01D 45/14 55/394 |
| 6,183,407 | B1 * | 2/2001 | Hallgren | B04B 1/04 494/49 |
| 6,821,319 | B1 * | 11/2004 | Moberg | B01D 45/14 55/385.3 |
| 7,077,881 | B2 * | 7/2006 | Franzen | B01D 45/14 210/512.1 |
| 7,081,146 | B2 * | 7/2006 | Hallgren | B01D 45/12 210/512.1 |
| 7,258,713 | B2 * | 8/2007 | Eubank | F02M 35/022 55/401 |
| 7,811,347 | B2 * | 10/2010 | Carlsson | B01D 45/14 55/385.3 |
| 2003/0233939 | A1 * | 12/2003 | Szepessy | B01D 45/14 95/270 |
| 2004/0107681 | A1 * | 6/2004 | Carlsson | B01D 45/14 55/406 |
| 2004/0214710 | A1 * | 10/2004 | Herman | B04B 5/005 494/36 |
| 2005/0039604 | A1 * | 2/2005 | Hallgren | B01D 45/12 96/281 |
| 2005/0198932 | A1 * | 9/2005 | Franzen | B01D 45/14 55/406 |
| 2006/0142135 | A1 * | 6/2006 | Hallgren | B01D 45/14 494/24 |
| 2007/0249479 | A1 * | 10/2007 | Eliasson | B01D 45/14 494/43 |
| 2009/0013658 | A1 * | 1/2009 | Borgstrom | B01D 45/14 55/447 |
| 2009/0186752 | A1 * | 7/2009 | Isaksson | B01D 45/14 494/40 |
| 2010/0180854 | A1 * | 7/2010 | Baumann | B04B 5/005 123/196 A |
| 2011/0011795 | A1 * | 1/2011 | Hoff | B04B 5/005 210/512.1 |
| 2011/0281712 | A1 * | 11/2011 | Schlamann | B01D 45/14 494/7 |
| 2014/0069398 | A1 * | 3/2014 | Roelver | B01D 45/14 123/572 |
| 2016/0082378 | A1 * | 3/2016 | Ishida | B01D 45/12 55/403 |
| 2017/0072409 | A1 * | 3/2017 | Pogen | B04B 5/12 |
| 2018/0179929 | A1 * | 6/2018 | Ishida | B04B 1/04 |

FOREIGN PATENT DOCUMENTS

| | | |
|---|---|---|
| JP | 2003-184528 A | 7/2003 |
| JP | 2005-507310 A | 3/2005 |
| JP | 2008-502473 A | 1/2008 |
| WO | 2003/37521 A1 | 5/2003 |
| WO | WO-03037521 A1 | 5/2003 |
| WO | 2005/123220 A1 | 12/2005 |

OTHER PUBLICATIONS

Japanese Office Action for Japanese Application No. 2016-504902 dated Aug. 8, 2017 (with machine translation).
Extended European Search Report for EP 14884204.0, EPO, Munich, dated Dec. 12, 2017.

* cited by examiner

OIL SEPARATOR

CROSS-REFERENCE TO RELATED APPLICATIONS

This application is a 371 U.S. National Stage of International Application No. PCT/JP2014/054630, filed Feb. 26, 2014. The disclosures of the above application are incorporated herein by reference.

TECHNICAL FIELD

The present invention relates to an oil separator that separates mist oil contained in target gas from the gas.

BACKGROUND ART

There has been known an oil separator that separates mist oil contained in target gas from the gas. For example, an oil separator described in Patent Literature 1 includes a cylindrical stationary housing, a cylindrical stationary casing with a ceiling, and a conical partition with an opening on the top surface. These components define a lower chamber and an upper chamber. The lower chamber includes a centrifugal rotor to clean oil. The upper chamber includes a gas cleaning device to clean gas. A lower end of the stationary housing is coupled to a base. The lower chamber is communicated with an internal space of the tubular base.

This tubular base is communicated with a combustion engine. Oil after being cleaned is returned to the combustion engine and gas from a crankcase is introduced to the combustion engine. In the internal space of the tubular base, a tubular fixing member is disposed which fixes the lower end of the shaft. Through the fixing member, oil to be cleaned is supplied.

The centrifugal rotor and the gas cleaning device are coupled with a tubular supporting member and are rotatable around a stationary shaft inserted through the supporting member. The centrifugal rotor internally includes a separation chamber. The oil is supplied to this separation chamber through a clearance between the supporting member and the stationary shaft and through an opening open at the supporting member. After the cleaning in the separation chamber, the supplied oil is discharged to a side portion through discharge ports disposed at a bottom surface of the centrifugal rotor. Discharging the oil generates a driving power to rotate the centrifugal rotor and the gas cleaning device.

CITATION LIST

Patent Literature

Patent Literature 1: Japanese Unexamined Patent Application Publication No. 2005-515065

DISCLOSURE OF THE INVENTION

Problems to be Solved by the Invention

In the foregoing oil separator, the lower chamber is coupled to the tubular base, and therefore is not versatile. That is, the lower chamber is needed to be prepared for each engine to which an oil separator is to be mounted. In addition, a supply passage for oil is restricted because oil is supplied through the fixing member disposed inside the tubular base. This also worsens the versatility of the oil separator. In addition, it is difficult to mount the oil separator to a target object other than an engine, for example, a vehicle body.

The present invention has been made under these circumstances, and an object of the present invention is to provide a highly versatile oil separator which is easy to mount to various targets.

Summary of Invention

To achieve the above-described object, the present invention is an oil separator for separating mist oil contained in target gas, the oil separator including: a rotor that are rotatable together with a spindle and separates the mist oil by rotation; a nozzle that is projected from a part of a peripheral surface of the spindle, the part being located below the rotor, and that injects oil from an injection hole to rotate the spindle around an axis; a housing including: an oil supply portion that supplies oil to be injected from the injection hole; an oil communicating portion for discharging oil injected from the injection hole; and a gas communicating portion for introducing the target gas; and a joint member that is removably mounted to the housing, and that includes a gas introducing portion and an oil discharge portion, the gas introducing portion introducing the target gas from outside and transferring the target gas to the gas communicating portion, the oil discharge portion receiving oil from the oil communicating portion and discharging the oil to outside.

According to the present invention, the gas introducing portion introducing the target gas from outside and the oil discharge portion discharging the oil to outside are disposed of a joint. In addition, the joint is removably mounted to the housing. Accordingly, it is possible to easily mount the oil separator to various target by preparing an appropriate type of the joint for each target object.

In the above-described oil separator, it is preferable that the joint member includes a common chamber communicating with each of the oil communicating portion, the gas communicating portion, the gas introducing portion, and the oil discharge portion and that the oil communicating portion and the gas communicating portion communicate an upper portion of the common chamber, and that the gas introducing portion communicates a side portion of the common chamber, and that the oil discharge portion communicates a lower portion of the common chamber. In such a configuration, in the common chamber, the target gas introduced the gas introducing portion come into contact with the oil which is flowing down from the oil communicating portion. Accordingly, oil mist contained in the target gas is partially taken into the oil, and this can increase the removal efficiency of oil in the target gas.

In the above-described oil separator, it is preferable that the oil communicating portion is composed of a through-opening formed on a bottom of the housing and penetrating the bottom in a thickness direction and that the gas communicating portion is composed of a tubular portion projecting upward from the bottom of the housing. In such a configuration, the tubular portion constituting the gas communicating portion defines a passage for the target gas. Accordingly, even if oil accumulates at the bottom of the housing, the gas communicating portion ensures a passage for the target gas. Consequently, a large amount of flowing target gas pushes back oil upward, and this can prevent a failure of deterioration of the removal efficiency of oil in blow-by gas.

In the above-described oil separator, it is preferable that an opening of a gas outlet of the gas communicating portion is located on an inner peripheral side with respect to a path of the injection hole. In such a configuration, it is possible to efficiently introduce the target gas.

In the above-described oil separator, it is preferable that the oil separator further comprises a bracket, and that the bracket is mounted to the housing and serves as a section on which the oil separator is mounted to a supporting body. In such a configuration, it is possible to mount the oil separator to a target object other than an engine. For example, the oil separator can be mounted to a vehicle body. In addition, since the mounting position of the bracket to be close to the center of gravity of each rotator (a separation disk, a nozzle, and a spindle), vibration and wobble of the oil separator can be prevented.

Advantageous Effects of Invention

According to the present invention, in an oil separator that separates mist oil contained in target gas from the gas, it is possible to easily mount the oil separator to various targets and to increase its versatility.

DETAILED DESCRIPTION

The following describes embodiments of the present invention with reference to the drawings. The following describes with an example of a closed crankcase ventilation system 1 (hereinafter referred to as a ventilation system 1) illustrated in FIG. 1.

Figure 1:
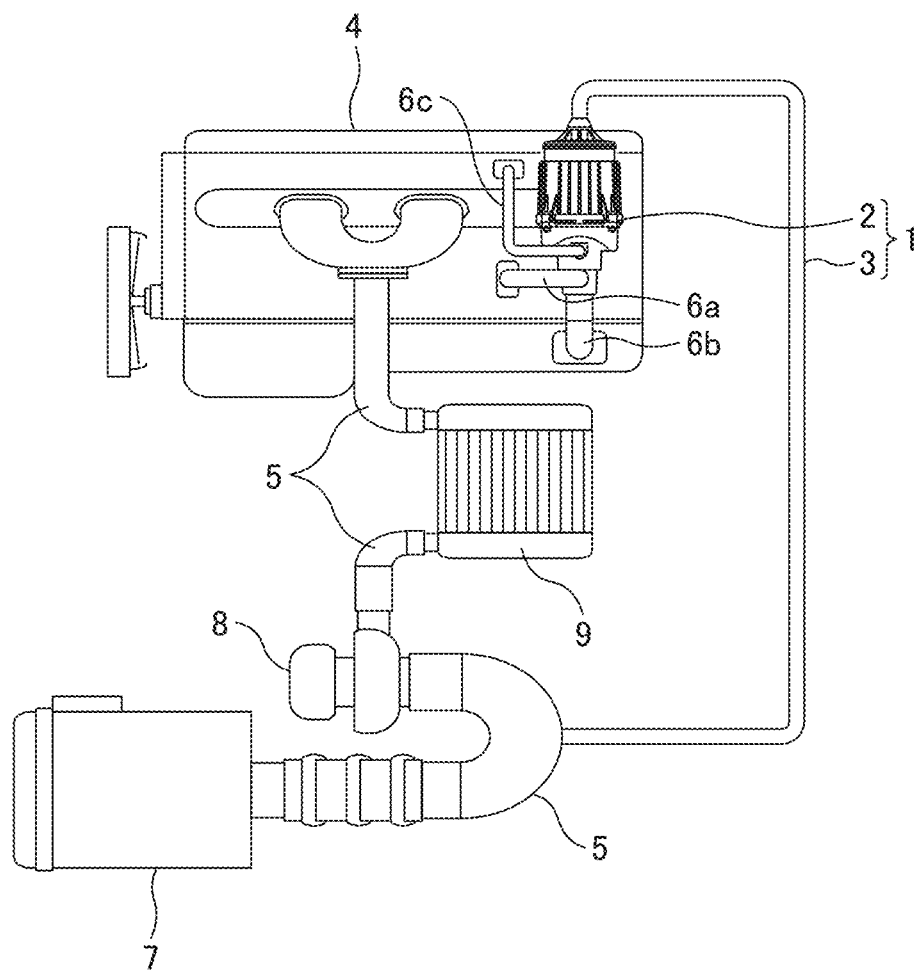
FIG. 1 is a schematic diagram illustrating a closed crankcase ventilation system.

As illustrated in FIG. 1, the ventilation system 1 includes an oil separator 2 and a breather pipe 3. The oil separator 2 processes blow-by gas (equivalent to target gas containing mist oil) discharged from an engine 4 to separate the mist oil. In this embodiment, the oil separator 2 is mounted at a side surface of an engine 4, which is a target object. The breather pipe 3 constitutes a return flow passage, through which the processed blow-by gas discharged from the oil separator 2 returns to an intake-side flow passage 5 of the engine 4.

In this ventilation system 1, the blow-by gas discharged from the engine 4 is introduced to the oil separator 2 through a gas introduction pipe 6a. The oil separated by the oil separator 2 is returned to the engine 4 through an oil discharge pipe 6b. On the other hand, the processed blow-by gas is discharged from an upper end portion of the oil separator 2 and then is returned to the intake-side flow passage 5 through the breather pipe 3. Specifically, the processed blow-by gas is returned to a part at which an air filter 7 is coupled to a turbocharger 8 in the intake-side flow passage 5. The returned blow-by gas is mixed with fresh air from the air filter 7 and is compressed by the turbocharger 8. Afterwards, the blow-by gas is cooled by a charge cooler 9 and is supplied to the engine 4.

Figure 2:
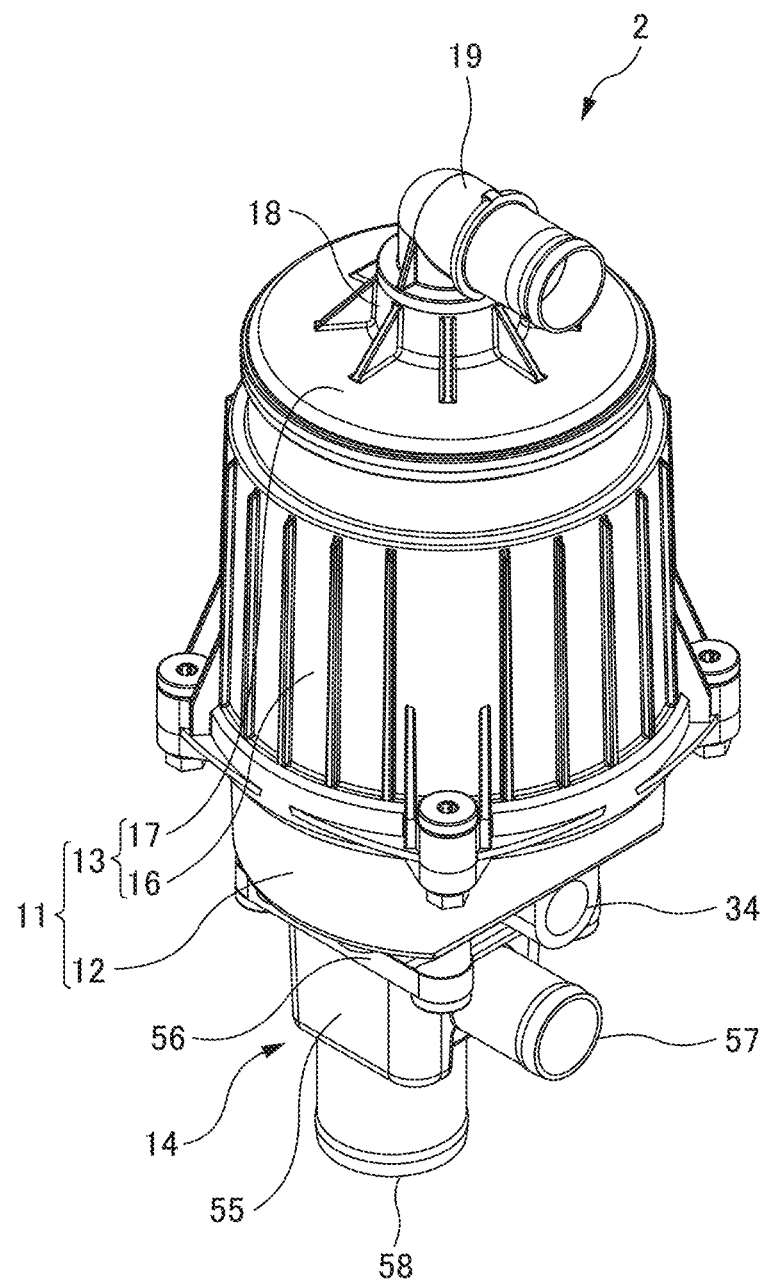
FIG. 2 is a diagram of an oil separator as viewed from obliquely above.
Figure 3:
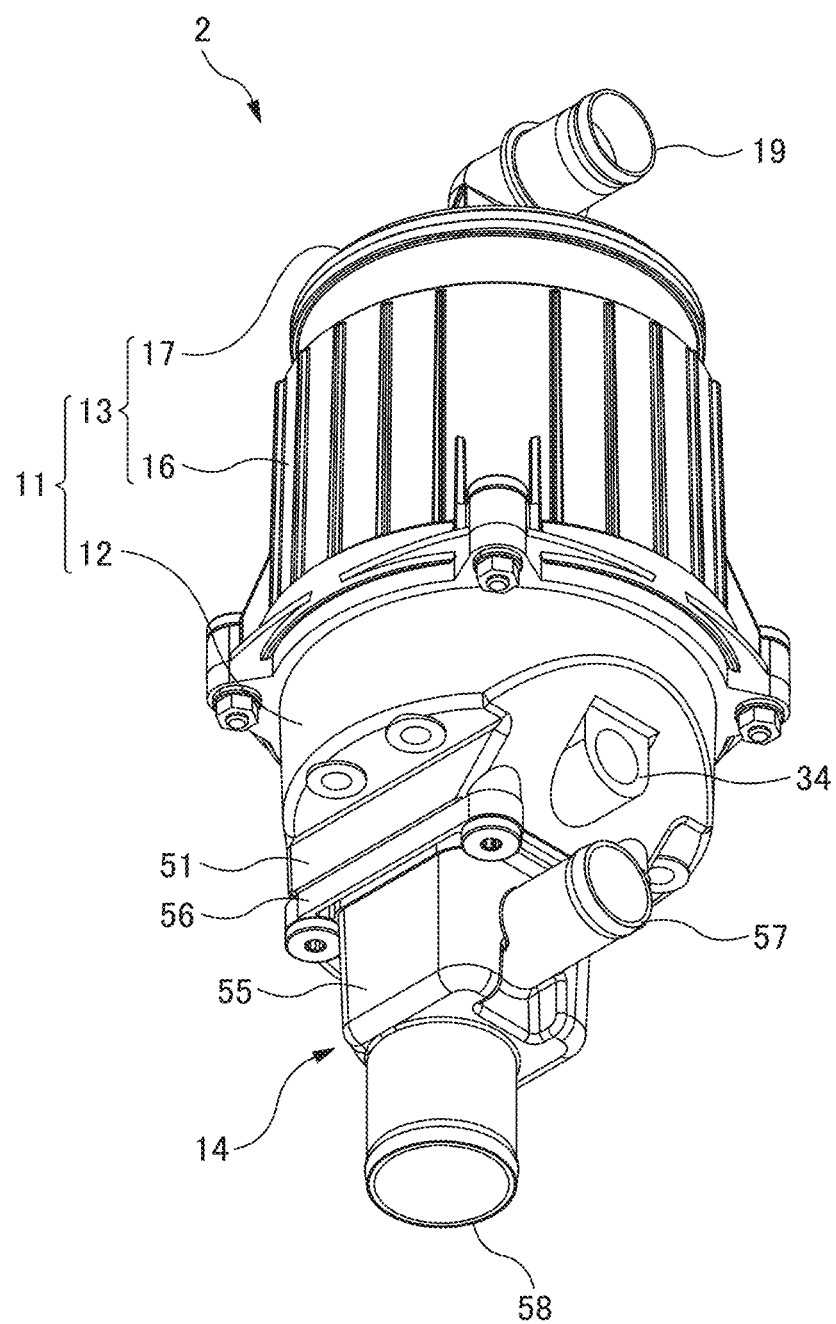
FIG. 3 is a diagram of the oil separator as viewed from obliquely below.

The following describes the oil separator 2. As illustrated in FIGS. 2 and 3, this oil separator 2 includes a housing 11, which includes a lower case 12 and an upper case 13. The housing 11 houses various components such as a rotor unit 21 and a PCV valve 24 in an internal space (a chamber) (described later).

The lower case 12 is a part that partitions a lower side part of the housing 11. The lower case 12 is constituted of a saucer-shaped member having a bottom and an opened top surface. The side portion of the lower case 12 has a cylindrical shape and a fitted portion is disposed at the upper end portion thereof. This fitted portion is fitted to a lower end portion of the upper case 13. A joint member 14 is removably mounted to the lower surface of the lower case 12. In this embodiment, the lower case 12, the communication tube portion, and the like are manufactured by casting; however, the lower case 12, the joint member 14, and the like may be manufactured by molding a resin.

The upper case 13 is a member mounted to the lower case 12 from above. The upper case 13 and the lower case 12 separate a chamber that houses components such as the rotor unit 21. An O-ring 15 is mounted to a coupling part at which the upper case 13 is coupled to the lower case 12 (see FIG. 5), and this ensures air tightness and liquid tightness. The upper case 13 includes a cylindrical body cover 16 and a disk-shaped top surface cover 17.

The top surface cover 17 is mounted in an airtight manner to the upper end portion of the body cover 16. A tubular gas discharge portion 18 is oriented upward at a center of the top surface cover 17. This gas discharge portion 18 is a part from which the processed blow-by gas is discharged. The breather pipe 3 is coupled to the gas discharge portion 18 via an outlet pipe 19.

Figure 4:
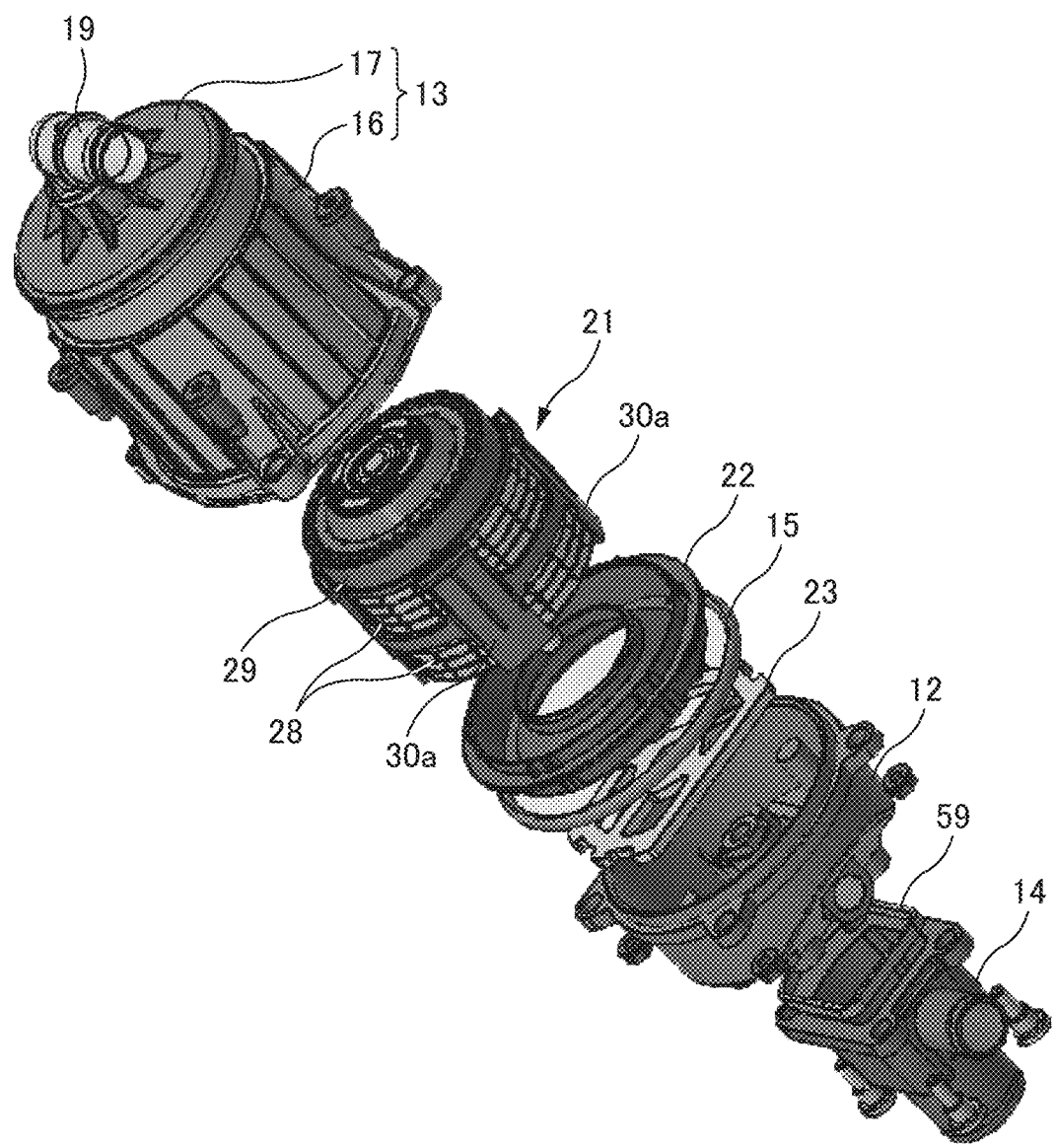
FIG. 4 is an exploded perspective view of the oil separator.

The following describes an internal structure of the oil separator 2. As illustrated in the exploded perspective view of FIG. 4, a chamber formed by the lower case 12 and the upper case 13 accommodates the rotor unit 21, a partition member 22 and a stationary frame 23. As illustrated in the cross-sectional view in FIG. 5, a PCV valve 24 is mounted to the inside of the top surface cover 17.

Figure 5:
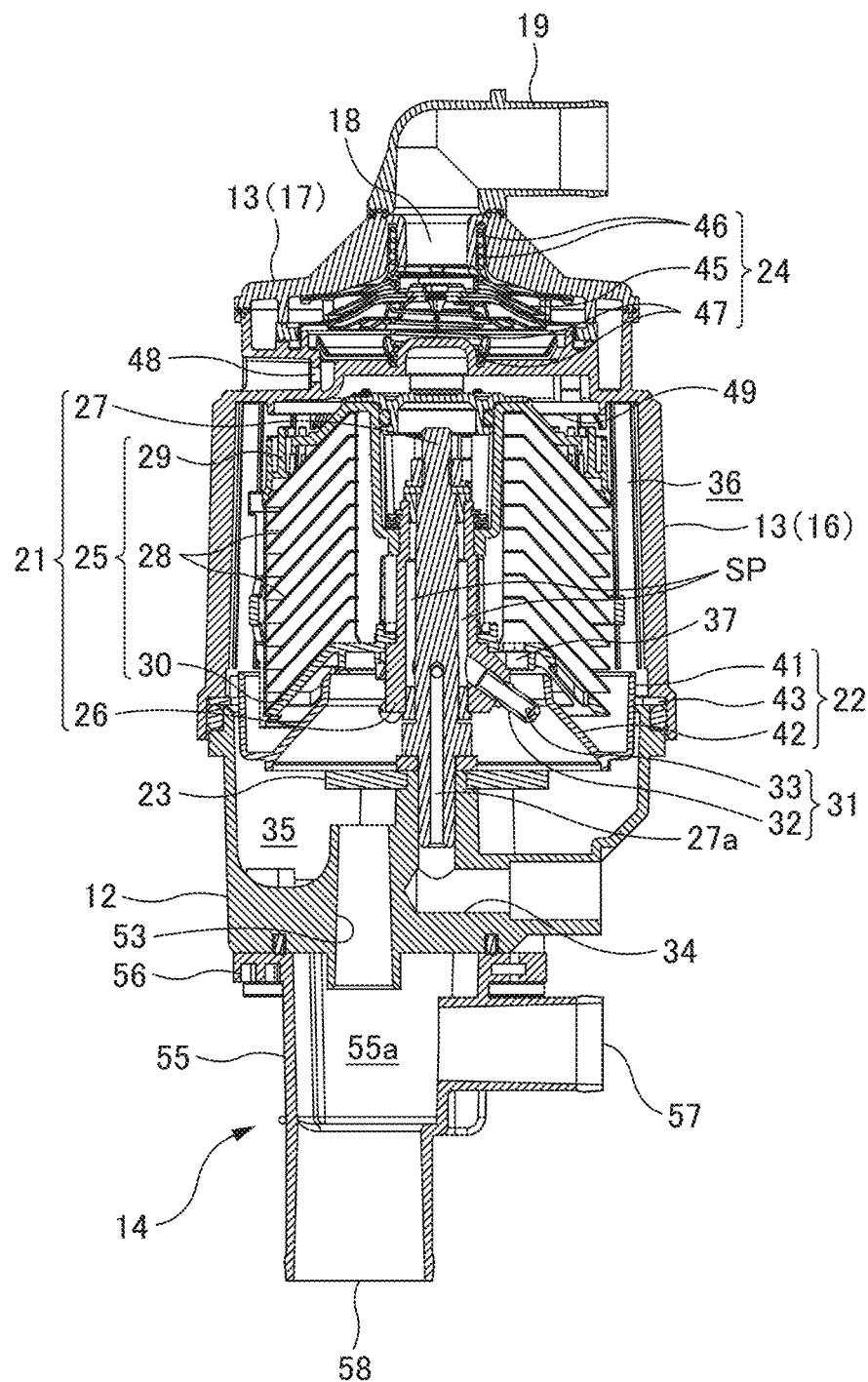
FIG. 5 is a cross-sectional view of an upper half portion of the oil separator.

First, the following describes the rotor unit 21. This rotor unit 21 is a mechanism to separate the mist oil contained in the blow-by gas. As illustrated in FIG. 5, the rotor unit 21 includes a rotor 25, a spindle 26, and a spindle shaft 27.

The rotor 25 is a part that condenses the mist oil by rotation and separates the mist oil from the blow-by gas. The rotor 25 includes a plurality of separation disks 28, an upper holder 29, and a lower holder 30. The separation disks 28 are ring-shaped plates that incline downward toward the outer peripheral side, in other words, plates having a side surface of a truncated cone shape. The separation disk 28 of this embodiment has a thickness of 1 mm or less, and is manufactured by molding resin. These separation disks 28 are laminated in an axial direction of the spindle 26. For convenience of explanation, the separation disks 28 are illustrated providing intervals from one another; however, the actual intervals are defined to be extremely narrow (for example, less than 1 mm).

The upper holder 29 is a member that holds the plurality of laminated separation disks 28 from above. Similarly, the lower holder 30 is a member that holds the separation disks 28 from below. In the outer peripheral edge of the lower holder 30, a plurality of coupling arms 30a for coupling to the upper holder 29 are disposed (see FIG. 4). In this embodiment, the four coupling arms 30a are provided circumferentially at intervals of 90 degrees. The upper ends of the coupling arms 30a are joined to the upper holder 29 so that the plurality of separation disks 28, the upper holder 29, and the lower holder 30 are integrated to constitute the rotor 25.

This rotor 25 has a cylindrical appearance. On the inner peripheral side of the rotor 25, there is a hollow part, and the hollow part vertically extends through. The spindle 26 is inserted into this hollow part and the spindle 26 and the rotor 25 are joined to one another. Accordingly, the rotor 25 rotates, together with the spindle 26, around the axis of the spindle 26.

Nozzles 31 project from a part of a peripheral surface of the spindle 26 located below the rotor 25. Each of the nozzles 31 is a part from which the oil supplied through the spindle shaft 27 is injected to generate a driving power to rotate the spindle 26 and the rotor 25.

The nozzles 31 of this embodiment include cylindrical nozzle bodies 32 and injection holes 33 disposed at distal end portions of the nozzle bodies 32. Base ends of the nozzle bodies 32 are coupled to the spindle 26, and the distal ends of the nozzle bodies 32 are closed. The nozzle bodies 32 are mounted at an angle of 45 degrees obliquely downward with respect to the axial direction of the spindle 26. The three nozzle bodies 32 are circumferentially disposed at intervals of 120 degrees. The injection hole 33 is disposed on a side surface at the distal end portion of the nozzle body 32. More specifically, the injection hole 33 is disposed in a direction perpendicular to the axial direction of the nozzle body 32 so that oil is injected horizontally.

The spindle shaft 27 is a pillar member serving as a bearing of the spindle 26, and supports the spindle 26 in a rotatable manner. The spindle shaft 27 internally includes an oil supply passage 27a to supply the oil. A lower end portion of the spindle shaft 27 is coupled to an upper end portion of a support tube portion 34 disposed in the lower case 12. The support tube portion 34 corresponds to the oil supply portion, and supplies the oil supply passage 27a with oil which has injected from the injection holes 33. And, the oil supply pipe 6c illustrated in FIG. 1 is coupled to the support tube portion 34. Accordingly, the oil supplied through the oil supply pipe 6c passes through the support tube portion 34, and then flows into the spindle shaft 27. Thereafter, the oil flows into the nozzle bodies 32, and then is injected from the injection holes 33.

As described above, the injection hole 33 is disposed at the distal end portion of the nozzle body 32 in a direction in which oil is injected horizontally. At the three nozzles 31 disposed at intervals of 120 degrees, formation positions for the injection holes 33 are matched. Accordingly, when the oil is injected from the respective injection holes 33, the rotor 25 and the spindle 26 rotate about the spindle shaft 27 as the axis.

The following describes the partition member 22. As illustrated in FIG. 5, the partition member 22 is a member that partitions the internal space (the chamber) of the housing 11 into a lower chamber 35 (a primary separation chamber) and an upper chamber 36 (a secondary separation chamber). And the partition member 22 forms a communication port 37. The blow-by gas in the lower chamber 35 is guided by the communication port 37 to the upper chamber 36. The partition member 22 has an outer peripheral portion 41 and a tapered portion 42. The outer peripheral portion 41 is a short cylindrical part and has a collar portion 43 projecting outwardly at the middle in the height direction. The tapered portion 42 is disposed on the inner peripheral side with respect to the outer peripheral portion 41, and has a tapered shape in which the diameter is gradually reduced from the lower end of the outer peripheral portion 41 toward the top. The tapered portion 42 of this embodiment has an inclined surface that inclines downward toward an outer peripheral side. an upper end opening of the tapered portion 42 forms the communication port 37.

The partition member 22 is fitted to the inner peripheral side of the fitted portion in the lower case 12. The collar portion 43 abuts on an upper end of the fitted portion from above to be positioned. Consequently, the tapered portion 42 is disposed immediately below the lower holder 30 included in the rotor 25. The chamber is partitioned into the lower chamber 35 and the upper chamber 36, which are bordered by the partition member 22. These lower chamber 35 and upper chamber 36 are communicated through the communication port 37.

When the rotor 25 rotates at a high speed, oil film, which is turning at high speed, is formed on the outer peripheral side with respect to the turning paths of the injection holes 33. When the blow-by gas contacts this oil film, the mist oil contained in the blow-by gas is taken in the oil film and is centrifuged. This makes it possible to reduce the mist oil content in the blow-by gas. Thus, in the lower chamber 35, the mist oil content in the blow-by gas can be reduced by the injection of the oil, which functions as the driving source for the spindle 26 and the rotor 25. Therefore, the lower chamber 35 functions as the primary separation chamber for the mist oil.

The following describes the PCV valve 24. As illustrated in FIG. 5, the PCV valve 24 includes a diaphragm 45, upper springs 46, and lower springs 47.

The diaphragm 45 is a valve element and is manufactured by molding rubber and resin. The diaphragm 45 is composed of a disk-shaped member. The upper springs 46 and the lower springs 47 are members to support the diaphragm 45 in such a manner that the diaphragm 45 can move vertically. The PCV valve 24 is placed on a pedestal portion at a position immediately below the top surface cover 17. The diaphragm 45 covers this pedestal portion in an airtight manner. a space defined by the pedestal portion and the diaphragm 45 is open to open air through an air communicating portion.

The diaphragm 45 vertically moves according to intake-side pressure of the engine 4 and internal pressure of the crankcase, to adjust the flow of the blow-by gas. That is, under an excessively large intake pressure (negative pressure) of the engine 4, the diaphragm 45 moves toward the gas discharge portion 18 (upward), and under a high pressure of the side close to the crankcase, the diaphragm 45 moves toward the opposite side (downward).

Accordingly, when the pressure in the upper chamber 36 becomes higher than a PCV-set pressure, the diaphragm 45 moves downward to increase a flow rate of the blow-by gas. On the contrary, when the pressure in the upper chamber 36 is lower than the PCV-set pressure, the diaphragm 45 moves upward to reduce the flow rate of the blow-by gas. Thus, the flow rate of the blow-by gas is appropriately adjusted, and thereby the crankcase-side pressure of the engine 4 maintains within a constant range.

An outer periphery of the pedestal portion on which the PCV valve 24 is placed is defined by a sidewall portion, the sidewall portion having a circular shape as viewed from above. a communicating window 48 is disposed at this sidewall portion. Through this communicating window 48, an upper part of the upper chamber 36 with respect to the diaphragm 45 and a part of the upper chamber 36 on the rotor 25 side communicate.

A cylindrical rib 49 is disposed at the lower side of the sidewall portion. This cylindrical rib 49 is a ring-shaped projection disposed at a position higher than the rotor unit 21 and lower than the diaphragm 45, and the cylindrical rib 49 is integrated with the body cover 16. In the upper end part of the body cover 16, the cylindrical rib 49 guides downwards fluid (oil and blow-by gas) which is flowing along the inner surface of the body cover 16 from the outer peripheral side to the inner peripheral side. Since this cylindrical rib 49 can also reduce the amount of oil, it is possible to surely restrain an attachment of the oil to the PCV valve 24.

Figure 6A:
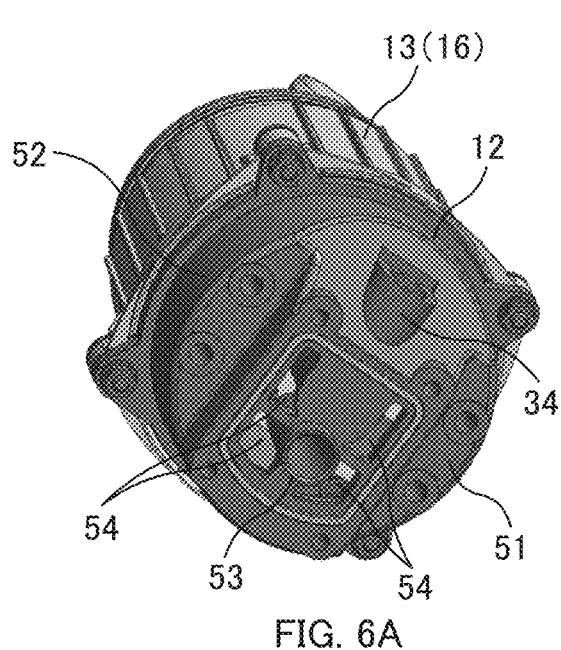
FIG. 6A is a diagram of a lower case as viewed from obliquely below.
Figure 6B:
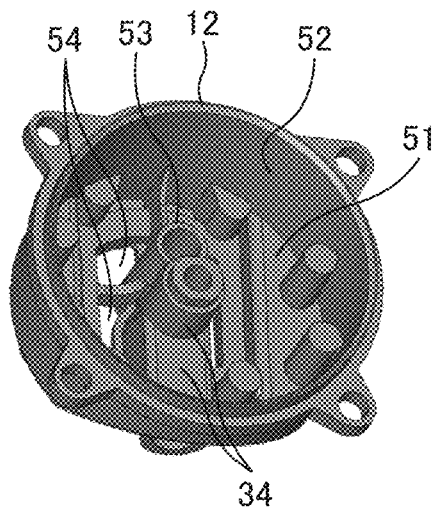
FIG. 6B is a diagram of the lower case as viewed from obliquely above.
Figure 6C:
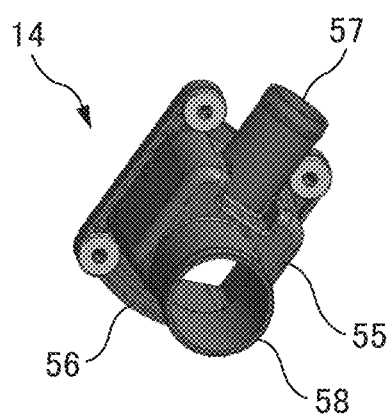
FIG. 6C is a diagram of a joint as viewed from obliquely below.
Figure 6D:
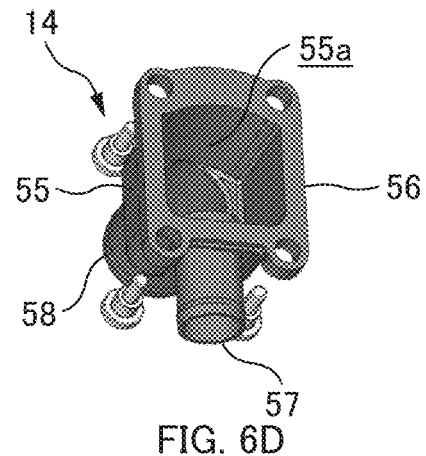
FIG. 6D is a diagram of joint member as viewed from obliquely above.

The lower case 12 and the joint member 14 will be described below. As illustrated in FIGS. 6A and 6B, the lower case 12 has a disk-shaped bottom 51. A cylindrical-shaped side portion 52 is disposed upright from an outer peripheral edge of the bottom 51. On the center of the bottom 51, an outlet-side part of the support tube portion 34, which is the side on which oil is discharged, is disposed upright. As illustrated in FIG. 5, an upper end of the support tube portion 34, which is a flow-in side to the oil supply passage 27a, is fitted to the stationary frame 23. This stationary frame 23 is a metallic frame (see FIG. 4) disposed to increase the rigidity of the support tube portion 34. As illustrated in FIGS. 6A and 6B, the inlet-side part of the support tube portion 34, which is the flow-in side of oil, extends along the bottom 51 toward the side. In addition, an end portion of the inlet-side part is open to outside at the side surface of the lower case 12.

In addition, a gas communicating portion 53 is disposed along the outlet-side part of the support tube portion 34. This gas communicating portion 53 introduces the blow-by gas from the inside of the joint member 14 to the inside of the lower case 12. The gas communicating portion 53 according to the present invention is a cylinder portion that penetrates the bottom 51 of the lower case 12 and that projects upward. An upper end (a gas outlet) of the gas communicating portion 53 is positioned on the inner peripheral side with respect to the paths of the injection holes 33 provided with the nozzles 31. Oil communicating portions 54 for discharging oil are disposed at the bottom 51 of the lower case 12. These oil communicating portions 54 are openings that penetrate the bottom 51 of the lower case 12 in the thickness direction. In the present invention, the oil communicating portions 54 are disposed at positions that surround the support tube portion 34 and the gas communicating portion 53.

The joint member 14 is a member mounted to the bottom 51 of the lower case 12 from the lower side. The joint member 14 includes a joint body 55, a mounting flange 56, a gas introducing portion 57, and an oil discharge portion 58.

The joint body 55 is a rectangular parallelepiped hollow member whose top surface is open. The internal space of the joint body 55 serves as a common chamber. The mounting flange 56 is a part used to mount the joint member 14 to the lower case 12. The mounting flange 56 is composed of plates which projects laterally from an upper end of the joint body 55. The mounting flange 56 includes screw openings provided respectively in its four corners. A fixing male screw is inserted into each screw opening, and is tightened into a female screw part formed on the bottom 51 of the lower case 12. Thereby, the joint member 14 is mounted to the lower case 12. Between the joint member 14 and the lower case 12, a rectangular ring-shaped packing 59 is mounted to ensure liquid tightness.

The gas introducing portion 57 is a part that introduces the blow-by gas to the inside of the oil separator 2, the blow-by gas being flowing in through the gas introduction pipe 6a. The gas introducing portion 57 is a cylindrical member laterally projecting from a sidewall of the joint body 55. The gas introducing portion 57 communicates an internal space 55a (the common chamber) of the joint body 55 on the side of the joint body 55. An end portion of the gas introduction pipe 6a is coupled to the projection part of the gas introducing portion 57.

The oil discharge portion 58 is a part for discharging to the engine 4 the oil which flows down from the oil communicating portions 54 of the lower case 12. The oil discharge portion 58 is a cylindrical member projecting downward from the bottom 51 of the joint body 55. The oil discharge portion 58 communicates the internal space 55a of the joint body 55 on the lower side of the joint body 55. To the projection part of the oil discharge portion 58, an end portion of the oil discharge pipe 6b is coupled.

Figure 7:
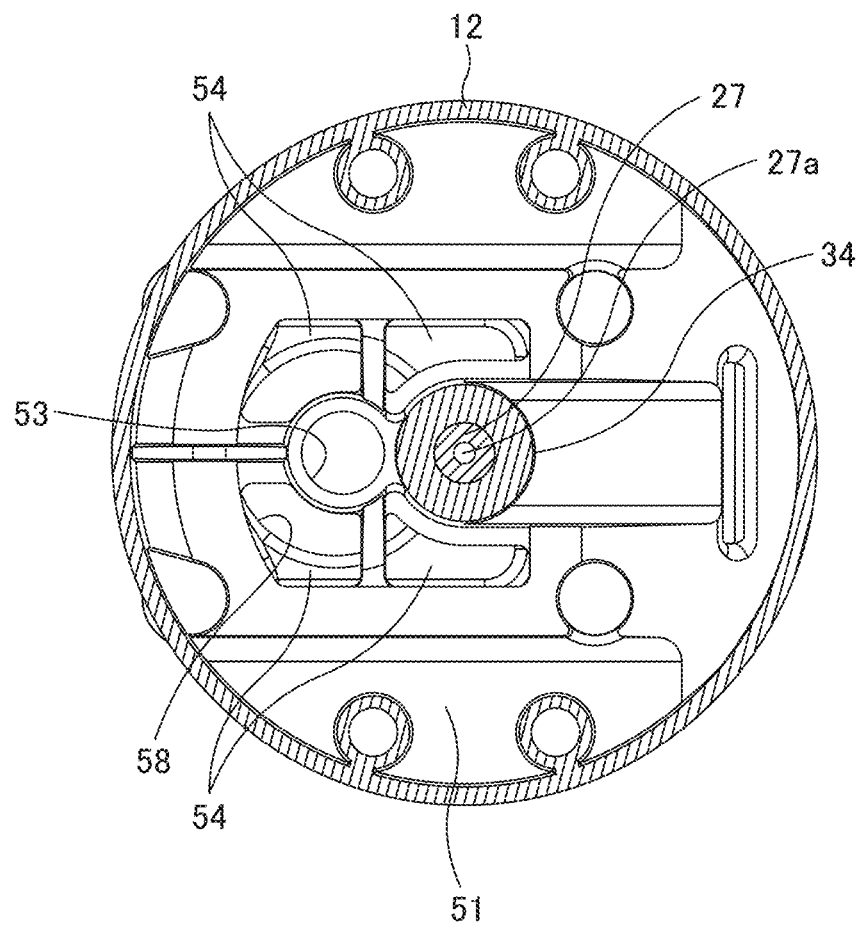
FIG. 7 is a diagram of an oil communicating portion and a gas communicating portion as viewed in a planar direction.

FIG. 7 is a drawing of the lower case 12, to which the joint member 14 is mounted, as viewed in a planar direction. As illustrated in FIG. 7, when the joint member 14 is mounted to the lower case 12, the oil discharge portion 58 is positioned immediately below the oil communicating portions 54. Accordingly, the oil flowing down from the oil communicating portions 54 is smoothly discharged from the oil discharge portion 58.

Here, the separation of the mist oil from the blow-by gas in the oil separator 2 having the foregoing configuration will be described.

Figure 8:
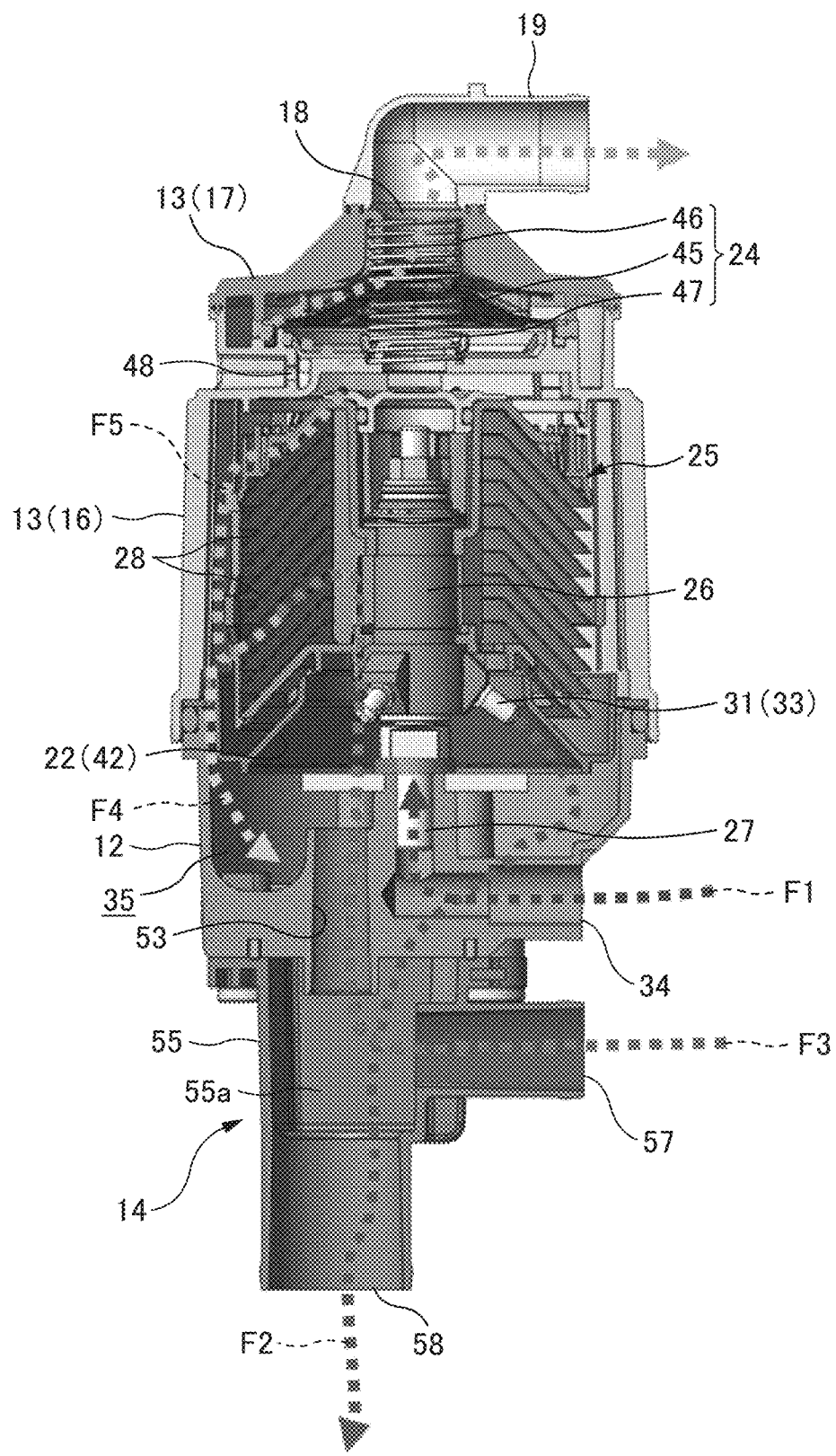
FIG. 8 is a diagram illustrating flows of blow-by bus and oil.

As illustrated in FIG. 8, the oil which has been supplied to the support tube portion 34 flows into the spindle shaft 27 as indicated by a path of reference symbol F1. The oil flows from the spindle shaft 27 to the nozzle bodies 32 and is injected from the injection holes 33. By the injection of the oil from each injection hole 33, the rotor 25 and the spindle 26 rotate around the spindle shaft 27.

The oil which has been injected from the injection holes 33 moves along the path indicated by reference symbol F2. That is, the injected oil is sprayed to the tapered portion 42 of the partition member 22. And then, the oil is guided obliquely below toward the outer peripheral side along the inclined surface of the tapered portion 42. Accordingly, a mixture of oil spray to the blow-by gas is restrained. Afterwards, the oil flows down on the inner surface of the lower case 12, and flows into the internal space 55a of joint member 14 from the oil communicating portion 54. And, the oil flows into the oil discharge portion 58 and is returned to the engine 4 through the oil discharge pipe 6b.

On the other hand, blow-by gas introduced from the engine 4 through the gas introduction pipe 6a moves along the path indicated by the arrow of reference symbol F3. That is, the blow-by gas flows into the gas introducing portion 57 of the joint member 14. The blow-by gas which has passed the gas introducing portion 57 flows into the gas communicating portion 53 from the internal space 55a of the joint body 55. The blow-by gas which has passed the gas communicating portion 53 flows into the hollow part of the rotor 25 through an area inside the motion paths of the injection holes 33.

The blow-by gas flowing into the hollow part of the rotor 25 moves through the clearances between the separation disks 28 to the outer peripheral direction of the rotor 25 due to a centrifugal force which is generated by the rotation of the rotor 25. Thus, when the blow-by gas moves to the outer peripheral direction of the rotor 25 due to the centrifugal force, the pressure at the inner peripheral side of the rotor 25 becomes lower than the pressure at the outer peripheral side. Due to the pressure difference, the blow-by gas which has passed the gas communicating portion 53 becomes more likely to flow into the hollow part at the rotor 25, and thereby the flow efficiency of the blow-by gas increases.

When the blow-by gas comes into contact with the separation disks 28, the mist oil contained in this blow-by gas attaches to the surfaces of the separation disks 28. The attached mist oil and additional mist oil coalesce, and thus the oil condenses on the surfaces of the separation disks 28. That is, the oil undergoes secondary separation. As described above, in the lower chamber 35, the mist oil is separated from the blow-by gas by primary separation. Accordingly, by the secondary separation at the separation disks 28, the mist oil is separated from the blow-by gas at a high level. Thus, the upper chamber 36 corresponds to the secondary separation chamber in which the secondary separation of the remaining mist oil is performed to separate the remaining mist oil from the blow-by gas which has undergone primary separation of the mist oil.

As shown in FIG. 5, a clearance SP is formed between the spindle 26 and the spindle shaft 27. This clearance SP serves as an oil guiding passage and is filled with the oil which is supplied to be injected from the nozzles 31. Since the oil supply pressure is sufficiently high, some oil filling the clearance passes through the upper end of the clearance and is discharged from the upper end portion of the spindle 26 to the hollow part of the rotor 25. Similar to the blow-by gas, due to the centrifugal force of the rotor 25, the oil discharged to the hollow part of the rotor 25 moves through the clearances between the separation disks 28 to the outer peripheral direction of the rotor 25.

The oil condensed on the surfaces of the separation disks 28 coalesces with the oil discharged to the hollow part of the rotor 25. This cleans the surfaces of the separation disks 28, and therefore simplifies maintenance for the separation disks 28.

The oil which has been condensed on the surfaces of the separation disks 28 and the oil which has coalesced move along the path indicated by reference symbol F4 in FIG. 8. That is, the oil is discharged from the outer peripheral edges of the separation disks 28, and collides with the inner surface of the body cover 16, and then flows down along this inner surface. And, the oil joins the oil injected from the nozzles 31 in the lower case 12, and passes the oil communicating portion 54, the oil discharge portion 58, and the oil discharge pipe 6b. Finally, the oil is returned to the engine 4.

The blow-by gas that has passed through the rotor 25 and from which the mist oil has been separated moves along a path indicated by reference symbol F5 in FIG. 8. That is, the blow-by gas that has passed through the rotor 25 becomes a turning flow and moves up inside the upper case 13. Thus, the blow-by gas is introduced to a top-surface-side space of the PCV valve 24. Afterwards, the blow-by gas moves through the outlet pipe 19 and is introduced to the breather pipe 3.

In the oil separator 2 according to the present embodiment which operates as described above, the oil communicating portions 54 and the gas communicating portion 53 communicate the upper portion of the internal space 55a (the common chamber) of the joint body 55. The gas introducing portion 57 communicates the internal space 55a of the joint body 55 on the side of the joint body 55. The oil discharge portion 58 communicates the internal space 55a of the joint body 55 on the lower side of the joint body 55. Accordingly, in the internal space 55a of the joint body 55, the blow-by gas introduced from the gas introducing portion 57 come into contact with the oil which is flowing down from the oil communicating portions 54. Thus, oil mist contained in the blow-by gas is partially taken into the oil, and this can increase the removal efficiency of oil in the blow-by gas.

Figure 9:
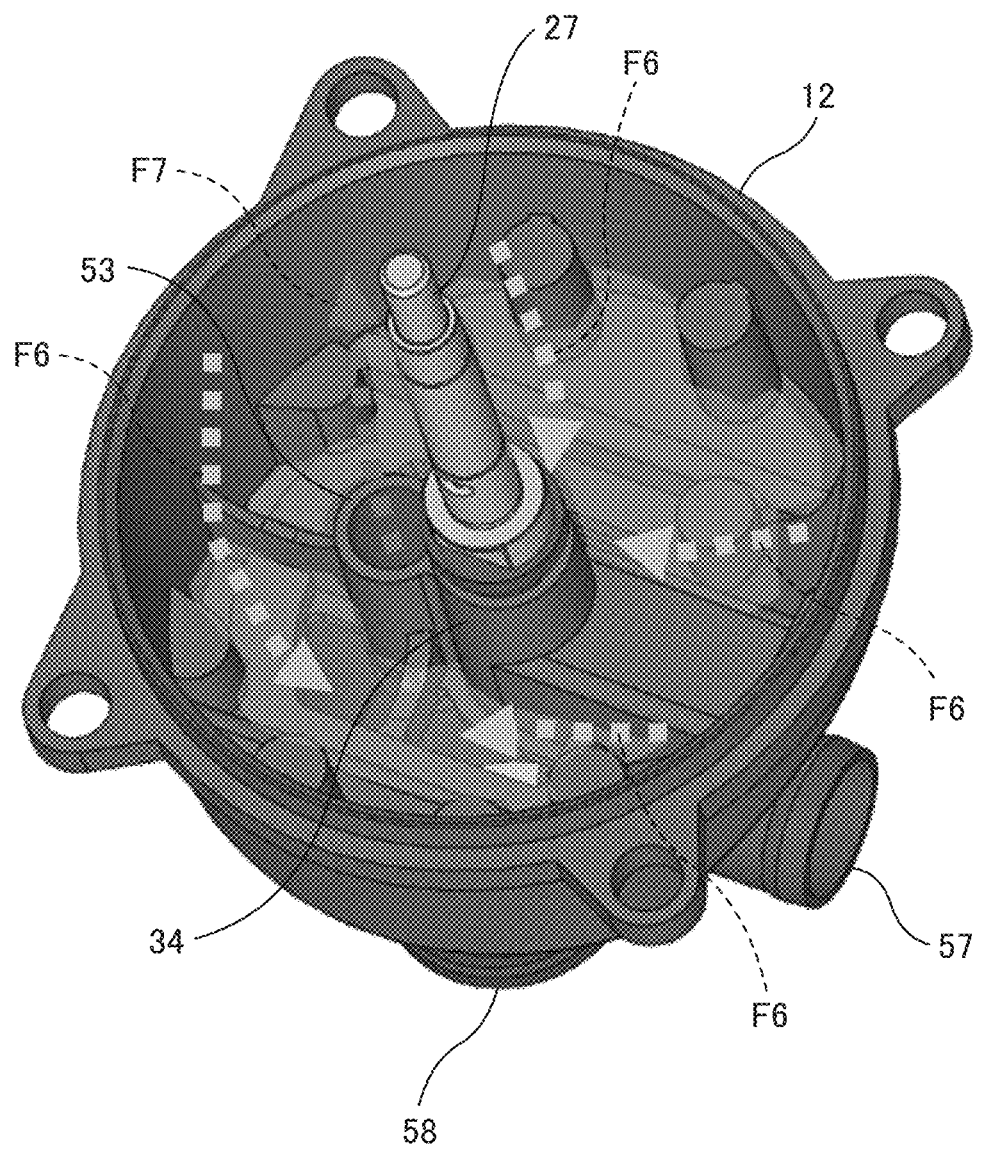
FIG. 9 is a diagram illustrating flows of oil and blow-by gas at the bottom of the lower case.

The oil communicating portions 54 are composed of through-openings, which are formed on the bottom 51 of the lower case 12 and which penetrate through the bottom 51 in the thickness direction. The gas communicating portion 53 is composed of a tubular portion projecting upward from the bottom 51 of the lower case 12. That is, the tubular portion constituting the gas communicating portion 53 defines a passage for blow-by gas extending vertically. Accordingly, a large amount of oil flows in through a path indicated by reference symbol F6 in FIG. 9. Even if the oil accumulates at the bottom 51 of the lower case 12, the gas communicating portion 53 ensures a passage for blow-by gas, as indicated by reference symbol F7. Consequently, a large amount of flowing blow-by gas pushes back the oil upward, and this can prevent a failure of deterioration of the removal efficiency of oil in the blow-by gas. Additionally, the gas outlet of the gas communicating portion 53 is disposed on the inner peripheral side with respect to the paths of the injection holes 33. This makes it possible to efficiently introduce the blow-by gas to the hollow part of the rotor 25.

Figure 10:
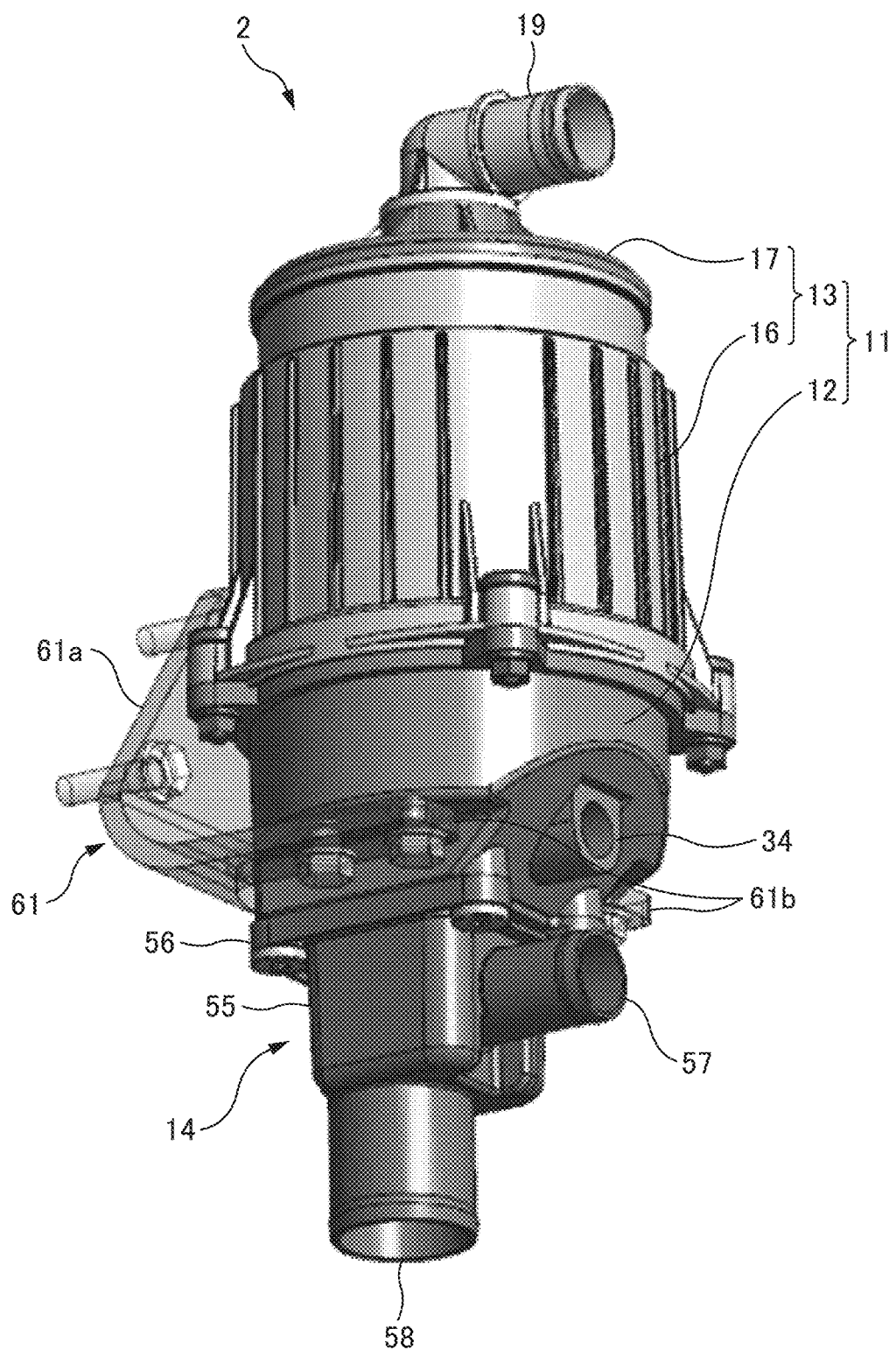
FIG. 10 is a diagram illustrating a state in which a bracket is mounted.

Here, a bracket 61 for mounting the oil separator 2 to the engine 4 will be described. The bracket 61 illustrated in FIG. 10 includes a mounting base 61a and forks 61b. The mounting base 61a is a part mounted to the engine 4 and is composed of a trapezoidal-shaped metal plate. The forks 61b are two elongated plate-shaped portions extending from both lower ends of the mounting base 61a in a direction perpendicular to the mounting base 61a. A plurality of screw holes are disposed in each of the mounting base 61a and forks 61b. Fixing screws are inserted into the screw holes and are tightened. Thereby, the mounting base 61a is mounted to a side surface of the engine 4, and the forks 61b is fixed to the bottom surface of the lower case 12.

The use of this bracket 61 allows a mounting position of the bracket 61 to be close to the center of gravity of each rotator (the separation disks 28, the nozzles 31, and the spindle 26). This can prevent vibration and wobble of the oil separator 2. In addition, this also makes it possible to mount the oil separator 2 to a target object other than the engine 4. For example, the oil separator 2 can be mounted to a vehicle body.

Figure 11:
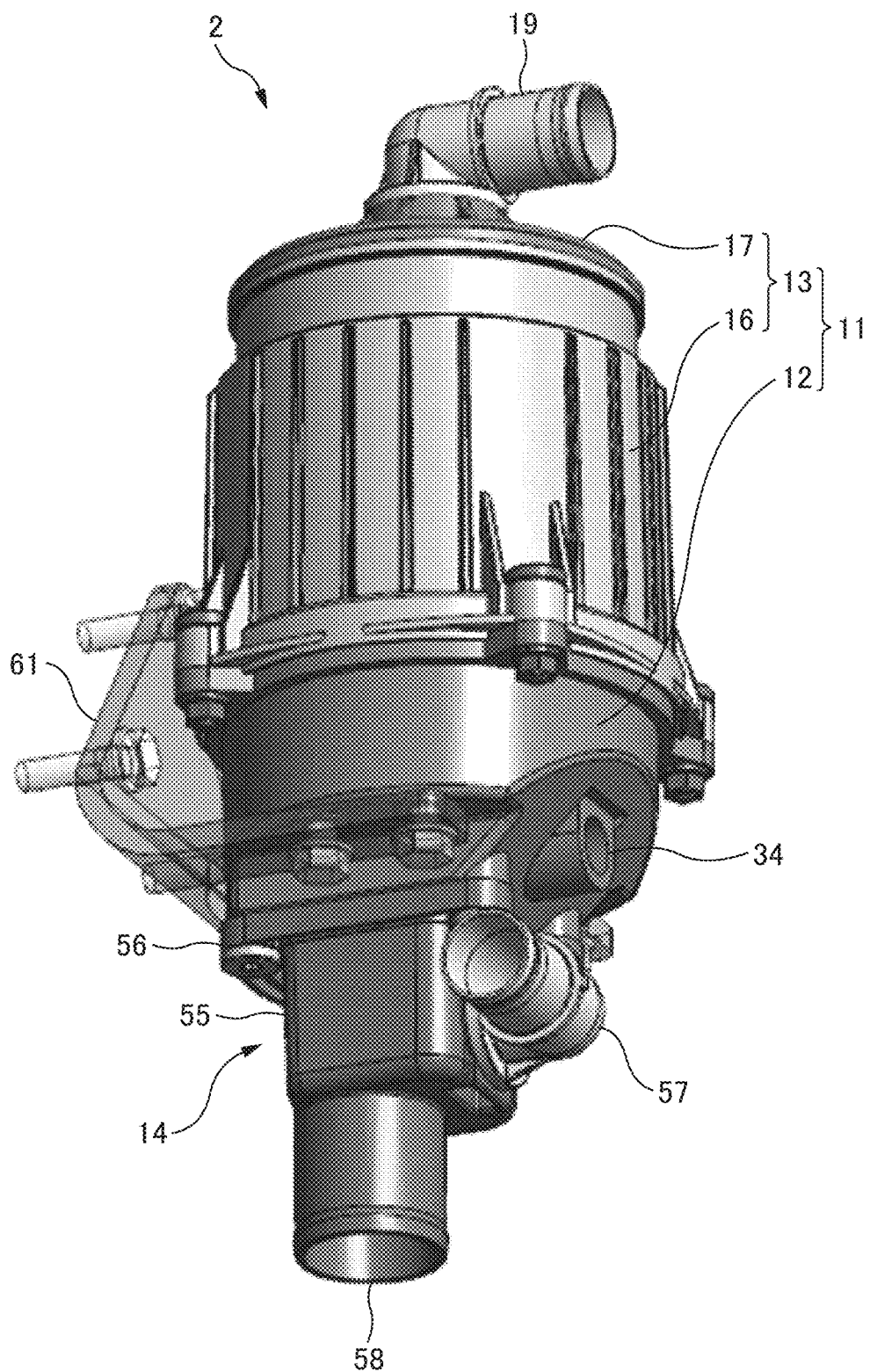
FIG. 11 is a diagram illustrating a first modification in which the gas introducing portion is composed of an elbow member.

The following describes variations of the joint member 14. First, the first modification illustrated in FIG. 11 differs from the above-described embodiment in that the gas introducing portion 57 provided with the joint member 14 is composed of an elbow member. In the first modification, the gas introducing portion 57 is composed of the elbow member being capable of nodding. Therefore, even if the position of the gas introduction pipe 6a, which introduces the blow-by gas, is restricted, this restriction can be dealt with relatively easily.

Figure 12:
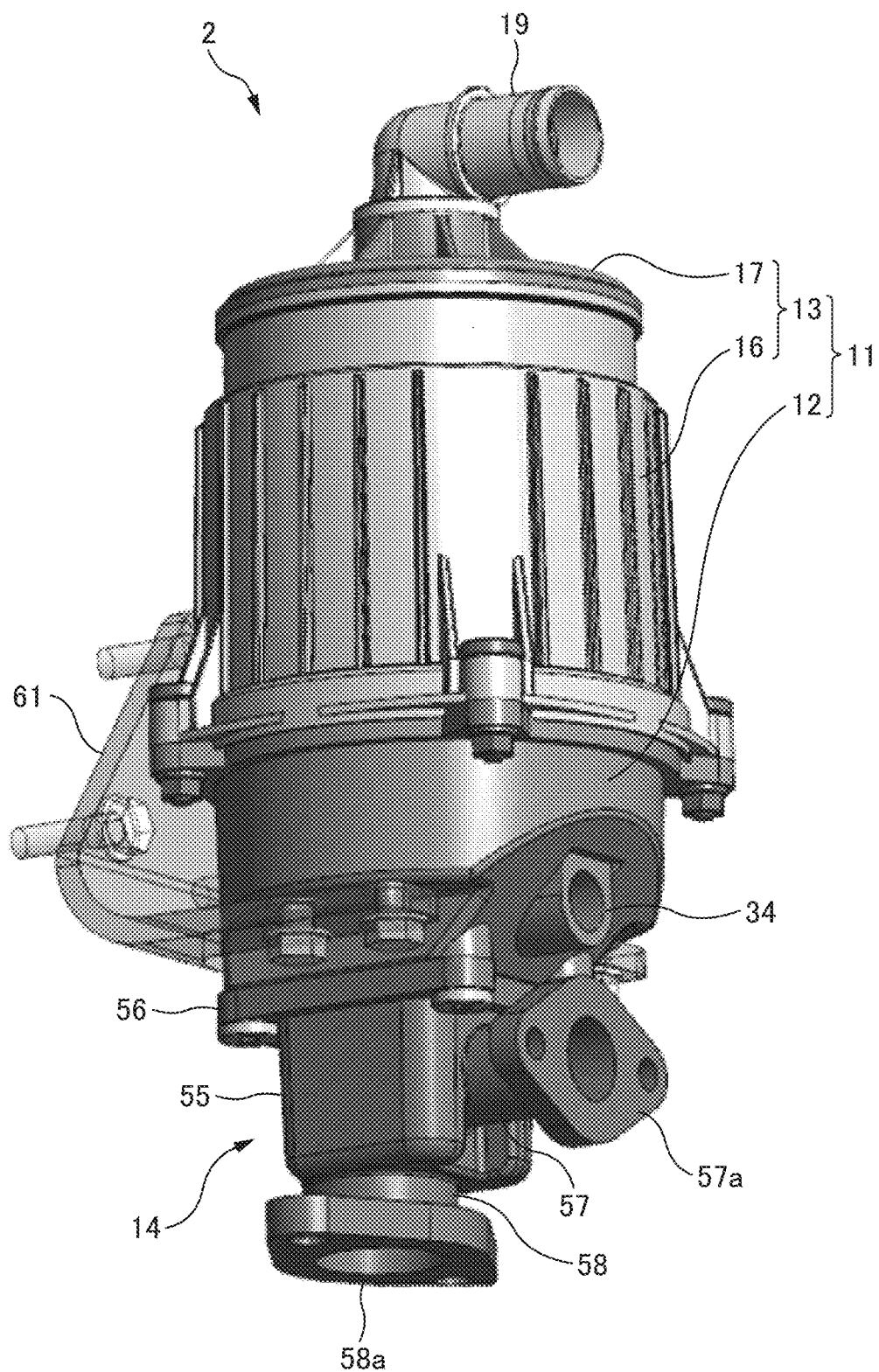
FIG. 12 is a diagram illustrating a second modification in which flanges are disposed of the gas introducing portion and the oil discharge portion.

The second modification illustrated in FIG. 12 differs from the above-described embodiment in that the gas introducing portion 57 and the oil discharge portion 58 include flanges 57a and 58a. In the second modification, the flanges 57a and the flange 58a are respectively disposed of the gas introducing portion 57 and the oil discharge portion 58. This makes it possible to couple easy to the gas introduction pipe 6a and the oil discharge pipe 6b, which include these flanges.

Figure 13:
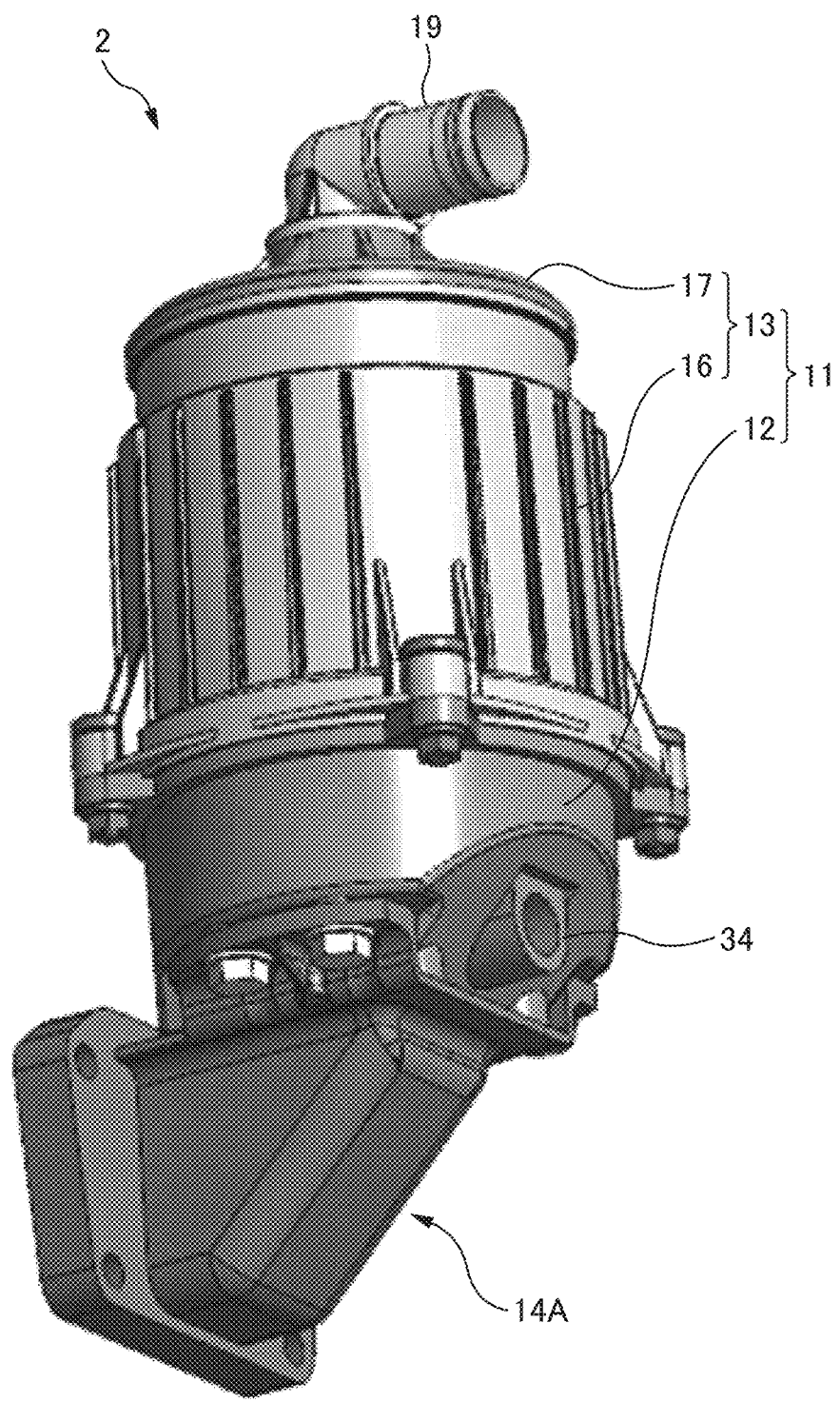
FIG. 13 is a diagram illustrating a third modification in which the joint member into which the gas introducing portion and the oil discharge portion are integrated is used.

The third modification illustrated in FIG. 13 differs from the above-described embodiment in that the third modification uses a joint member 14A where the gas introducing portion 57 and the oil discharge portion 58 are integrated.

As apparent from the above-described embodiment and these first modification to third modification, in this oil separator 2, the gas introducing portion 57 and the oil discharge portion 58 are disposed of the joint, and this joint is removably mounted to the lower case 12. Accordingly, it is sufficient to prepare the joint member 14 or 14A according to a vehicle type to which the oil separator 2 is to be mounted. This makes it possible to easily mount the oil separator 2 to various targets. Other components can be shared, and mass production of the oil separator can be achieved, which results in cost reduction.

The description of the above-described embodiment is for ease of understanding of the present invention and does not limit the present invention. The present invention may be modified or improved without departing from the gist and includes the equivalents.

REFERENCE SIGNS LIST 1 closed crankcase ventilation system, 2 oil separator,
3 breather pipe, 4 engine, 5 intake-side flow passage,
6a gas introduction pipe, 6b oil discharge pipe,
6c oil supply pipe, 7 air filter, 8 turbocharger, 9 charge cooler,
11 housing, 12 lower case, 13 upper case, 14 joint member,
14A joint member of third modification, 15 O-ring,
16 body cover, 17 top surface cover, 18 gas discharge portion,
19 outlet pipe, 21 rotor unit, 22 partition member,
23 stationary frame, 24 PCV valve, 25 rotor, 26 spindle,
27 spindle shaft, 27a oil supply passage, 28 separation disk,
29 upper holder, 30 lower holder, 31 nozzle, 32 nozzle body,
33 injection hole, 34 support tube portion of lower case,
35 lower chamber, 36 upper chamber, 37 communication port,
41 outer peripheral portion of partition member,
42 tapered portion of partition member,
43 collar portion of partition member, 45 diaphragm of PCV valve,
46 upper spring of PCV valve, 47 lower spring of PCV valve,
48 communicating window,
51 bottom of lower case, 52 side portion of lower case,
53 gas communicating portion of lower case,
54 oil communicating portion of lower case,
55 joint body of joint member,
55a internal space of joint body (common chamber),
56 mounting flange of joint member,
57 gas introducing portion of joint member,
58 oil discharge portion of joint member, 59 packing,
61 bracket, 61a mounting base, 61b fork

The invention claimed is:

1. An oil separator for separating mist oil contained in target gas, the oil separator comprising:
   a rotor that are rotatable together with a spindle and separates the mist oil by rotation;
   a nozzle that is projected from a part of a peripheral surface of the spindle, the part being located below the rotor, and that injects oil from an injection hole to rotate the spindle around an axis;
   a housing including:
   an oil supply portion that supplies oil to be injected from the injection hole;
   an oil communicating portion for discharging oil injected from the injection hole; and
   a gas communicating portion for introducing the target gas; and
   a joint member that is removably mounted to the housing and includes a gas introducing portion and an oil discharge portion, the gas introducing portion introducing the target gas from outside and transferring the target gas to the gas communicating portion, the oil discharge portion receiving oil from the oil communicating portion and discharging the oil to outside, wherein
   the joint member includes a common chamber communicating with each of the oil communicating portion, the gas communicating portion, the gas introducing portion, and the oil discharge portion, wherein
   the oil communicating portion and the gas communicating portion communicate an upper portion of the common chamber,
   the gas introducing portion communicates a side portion of the common chamber, and
   the oil discharge portion communicates a lower portion of the common chamber.

2. The oil separator according to claim 1, wherein the oil separator further comprises a bracket, and
   the bracket is mounted to the housing and serves as a section on which the oil separator is mounted to a supporting body.

3. The oil separator according to claim 1, wherein
   the oil communicating portion is composed of a through-opening formed on a bottom of the housing and penetrating the bottom in a thickness direction, and
   the gas communicating portion is composed of a tubular portion projecting upward from the bottom of the housing.

4. An oil separator for separating mist oil contained in target gas, the oil separator comprising:
   a rotor that are rotatable together with a spindle and separates the mist oil by rotation;
   a nozzle that is projected from a part of a peripheral surface of the spindle, the part being located below the rotor, and that injects oil from an injection hole to rotate the spindle around an axis;
   a housing including:
   an oil supply portion that supplies oil to be injected from the injection hole;
   an oil communicating portion for discharging oil injected from the injection hole; and a gas communicating portion for introducing the target gas; and a joint member that is removably mounted to the housing and includes a gas introducing portion and an oil discharge portion, the gas introducing portion introducing the target gas from outside and transferring the target gas to the gas communicating portion, the oil discharge portion receiving oil from the oil communicating portion and discharging the oil to outside, wherein the oil communicating portion is composed of a through-opening formed on a bottom of the housing and penetrating the bottom in a thickness direction, and the gas communicating portion is composed of a tubular portion projecting upward from the bottom of the housing.

5. The oil separator according to claim 4, wherein the oil separator further comprises a bracket, and the bracket is mounted to the housing and serves as a section on which the oil separator is mounted to a supporting body.

6. An oil separator for separating mist oil contained in target gas, the oil separator comprising:

a rotor that are rotatable together with a spindle and separates the mist oil by rotation;

a nozzle that is projected from a part of a peripheral surface of the spindle, the part being located below the rotor, and that injects oil from an injection hole to rotate the spindle around an axis;

a housing including:

an oil supply portion that supplies oil to be injected from the injection hole;

an oil communicating portion for discharging oil injected from the injection hole; and a gas communicating portion for introducing the target gas; and a joint member that is removably mounted to the housing and includes a gas introducing portion and an oil discharge portion, the gas introducing portion introducing the target gas from outside and transferring the target gas to the gas communicating portion, the oil discharge portion receiving oil from the oil communicating portion and discharging the oil to outside, wherein an opening of a gas outlet of the gas communicating portion is located only on an inner peripheral side with respect to a path of the injection hole.

7. The oil separator according to any claim 6, wherein the oil separator further comprises a bracket, and the bracket is mounted to the housing and serves as a section on which the oil separator is mounted to a supporting body.

* * * * *